United States Patent [19]

Mattson

[11] Patent Number: 4,796,435
[45] Date of Patent: Jan. 10, 1989

[54] BY-PRODUCTS CHILLER AND METHOD FOR USING SAME

[75] Inventor: Glenn H. Mattson, Chanhassen, Minn.

[73] Assignee: Omaha Cold Storage Terminals, Inc., Omaha, Nebr.

[21] Appl. No.: 945,372

[22] Filed: Dec. 22, 1986

Related U.S. Application Data

[63] Continuation-in-part of Ser. No. 856,469, Apr. 28, 1986, Pat. No. 4,700,546.

[51] Int. Cl.⁴ .................. F25D 13/06; F25D 17/02
[52] U.S. Cl. ............................. 62/63; 62/381
[58] Field of Search ............... 62/63, 64, 65, 374, 62/375, 380, 381

[56] References Cited

U.S. PATENT DOCUMENTS

| | | |
|---|---|---|
| 2,794,326 | 6/1957 | Mencacci . |
| 2,942,429 | 6/1960 | Dolah . |
| 3,015,219 | 1/1962 | Veyrie .................. 62/381 |
| 3,022,646 | 2/1962 | Zebarth ................. 62/381 |
| 3,092,975 | 6/1963 | Zebarth . |
| 3,097,501 | 7/1963 | Pappas . |
| 3,213,634 | 10/1965 | Granata . |
| 3,214,928 | 11/1965 | Oberdorfer ............. 62/63 |
| 3,240,026 | 3/1966 | Van Dolah et al. ..... 62/63 |
| 3,368,363 | 2/1968 | Alaburda et al. ....... 62/64 |
| 3,395,549 | 8/1968 | Grimes . |
| 3,407,872 | 10/1968 | Crane ..................... 165/109 |
| 3,410,101 | 12/1968 | Morris . |
| 3,426,546 | 2/1969 | Crane . |
| 3,445,030 | 5/1969 | Rubin . |
| 3,488,973 | 1/1970 | Harben, Jr. . |
| 3,498,208 | 3/1970 | Longe . |
| 3,555,838 | 1/1971 | Morris, Jr. . |
| 3,587,241 | 6/1971 | Hagen .................... 62/63 |
| 3,623,331 | 11/1971 | Buyens . |
| 3,906,743 | 9/1975 | Schorsch et al. . |
| 3,992,399 | 11/1976 | Spahn . |
| 4,033,142 | 7/1977 | Schorsch ................ 62/381 |
| 4,086,369 | 4/1978 | Mutoh et al. ........... 62/64 |
| 4,569,204 | 2/1986 | Ott et al. ................ 62/63 |
| 4,578,957 | 4/1986 | Cunningham ......... 62/375 |

Primary Examiner—Henry A. Bennet
Attorney, Agent, or Firm—Zarley, McKee, Thomte, Voorhees & Sease

[57] ABSTRACT

An improved animal by-products and hides chiller is provided for use in the packing plant for chilling fresh by-products and hides so that spoilage is minimized. The chiller generally includes a rotatable elongated tank having an inlet end for introducing the warm by-products or hides and an outlet end for removing the cooled by-products or hides from the tank. The side wall of the tank is void of apertures such that the need to clean the tank is minimized. As the tank rotates, baffle bars agitate the by-products or hides. The baffle bars are removably secured to the interior of the tank, and can be exchanged with other baffle bars so as to accommodate various types of by-products or hides being chilled. A strainer unit is positioned at the outlet end of the tank and receives the cooled by-products and the liquid coolant. The liquid coolant drains through a plurality of removable straining trays in a strainer unit so as to remove solids from the liquid. The liquid coolant is then pumped back to the coolant source for re-cooling thereby, and is subsequently re-introduced into the tank for cooling additional by-products or hides therein.

21 Claims, 4 Drawing Sheets

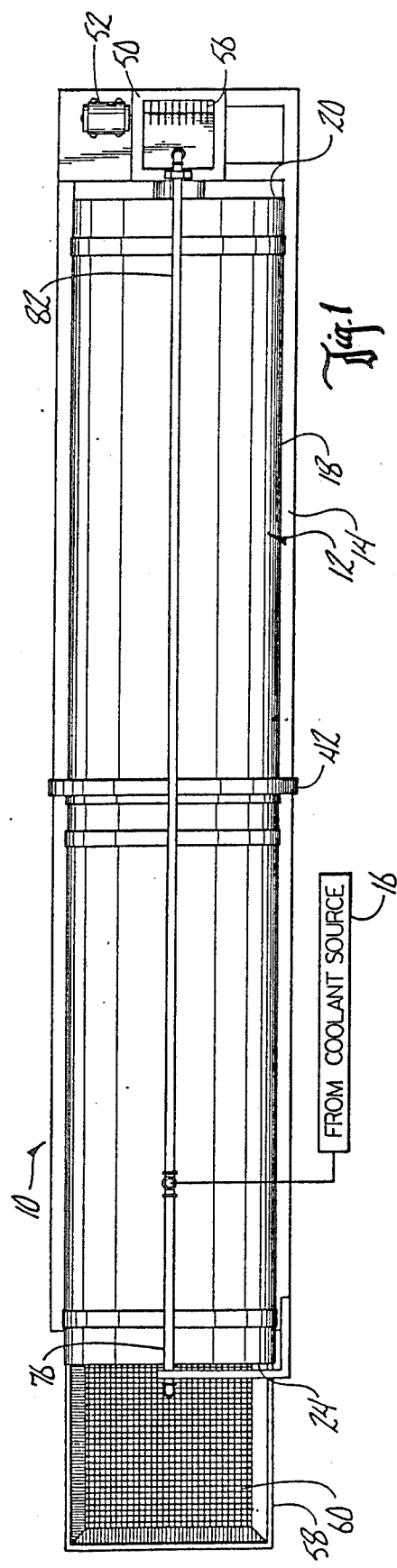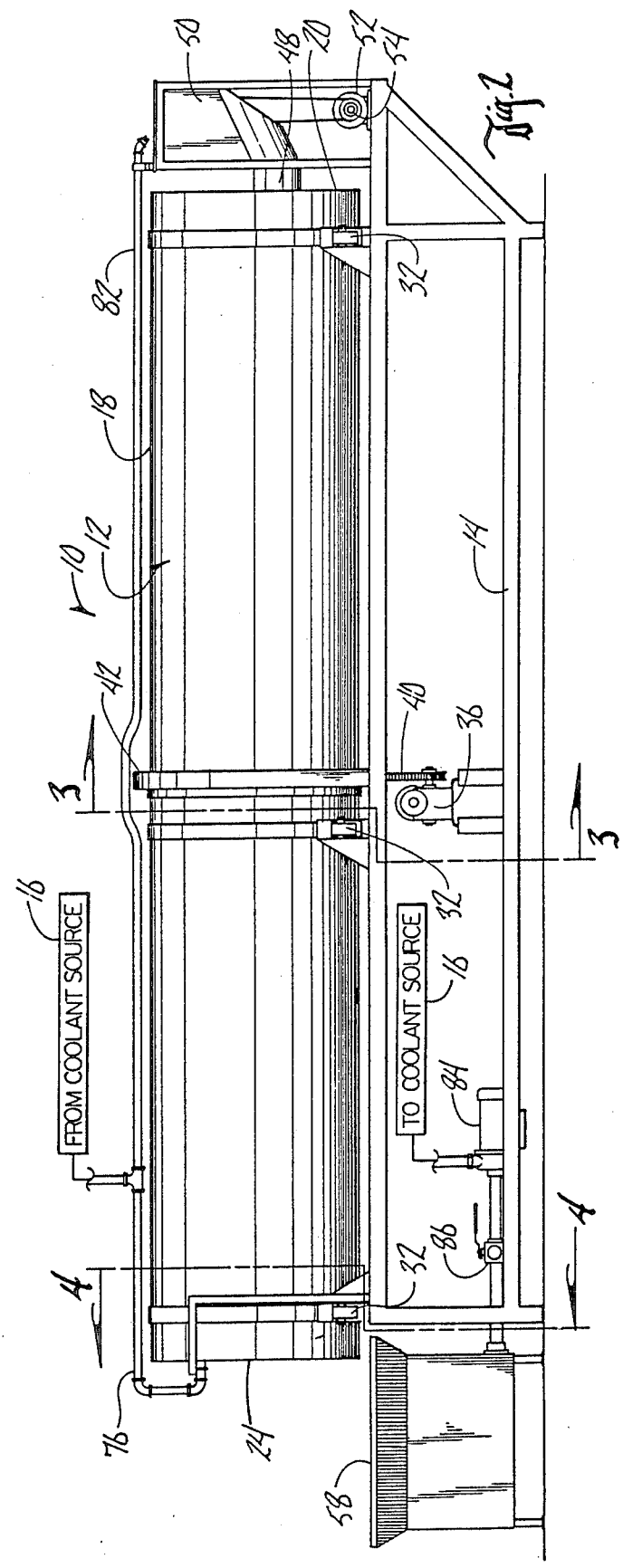

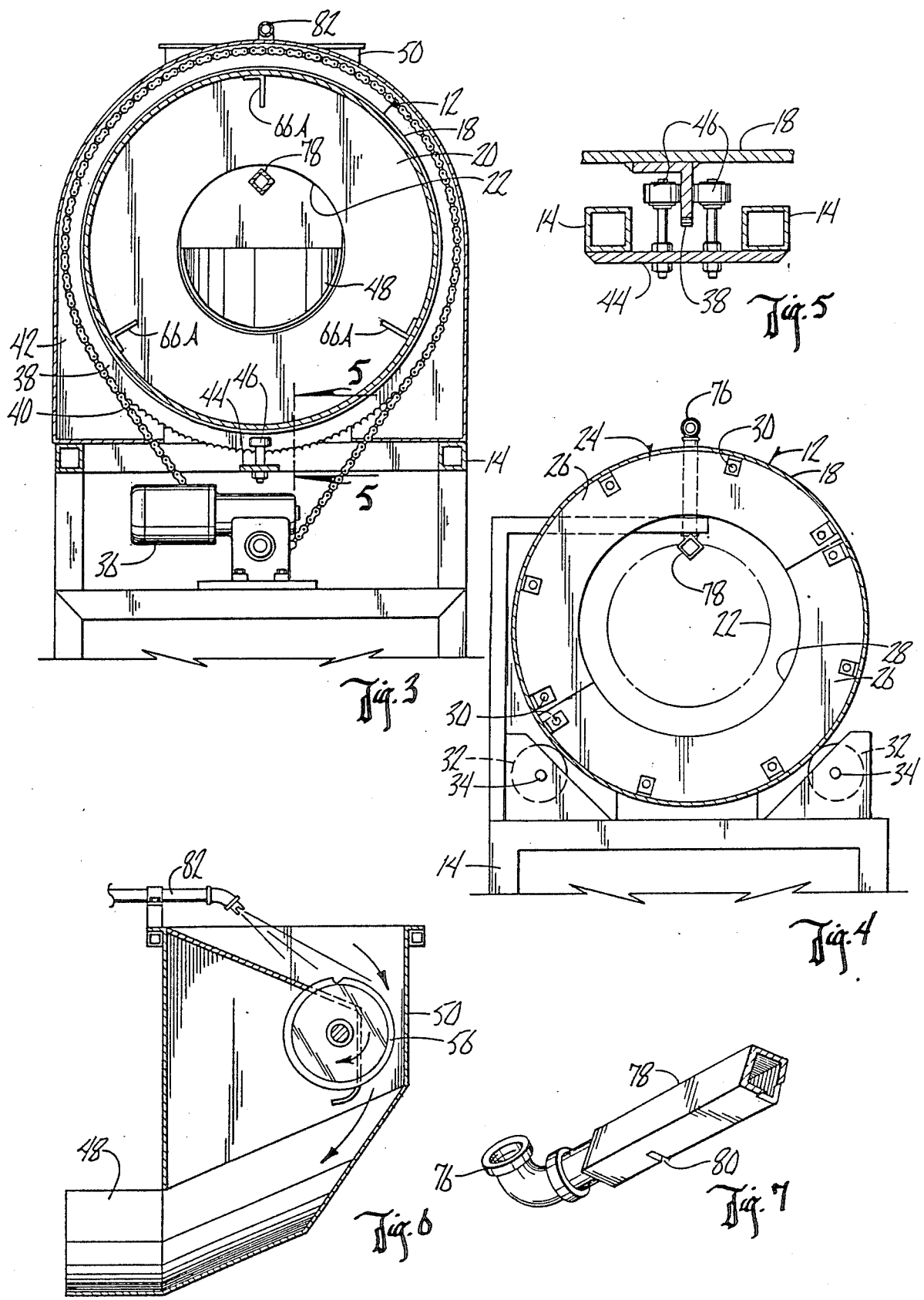

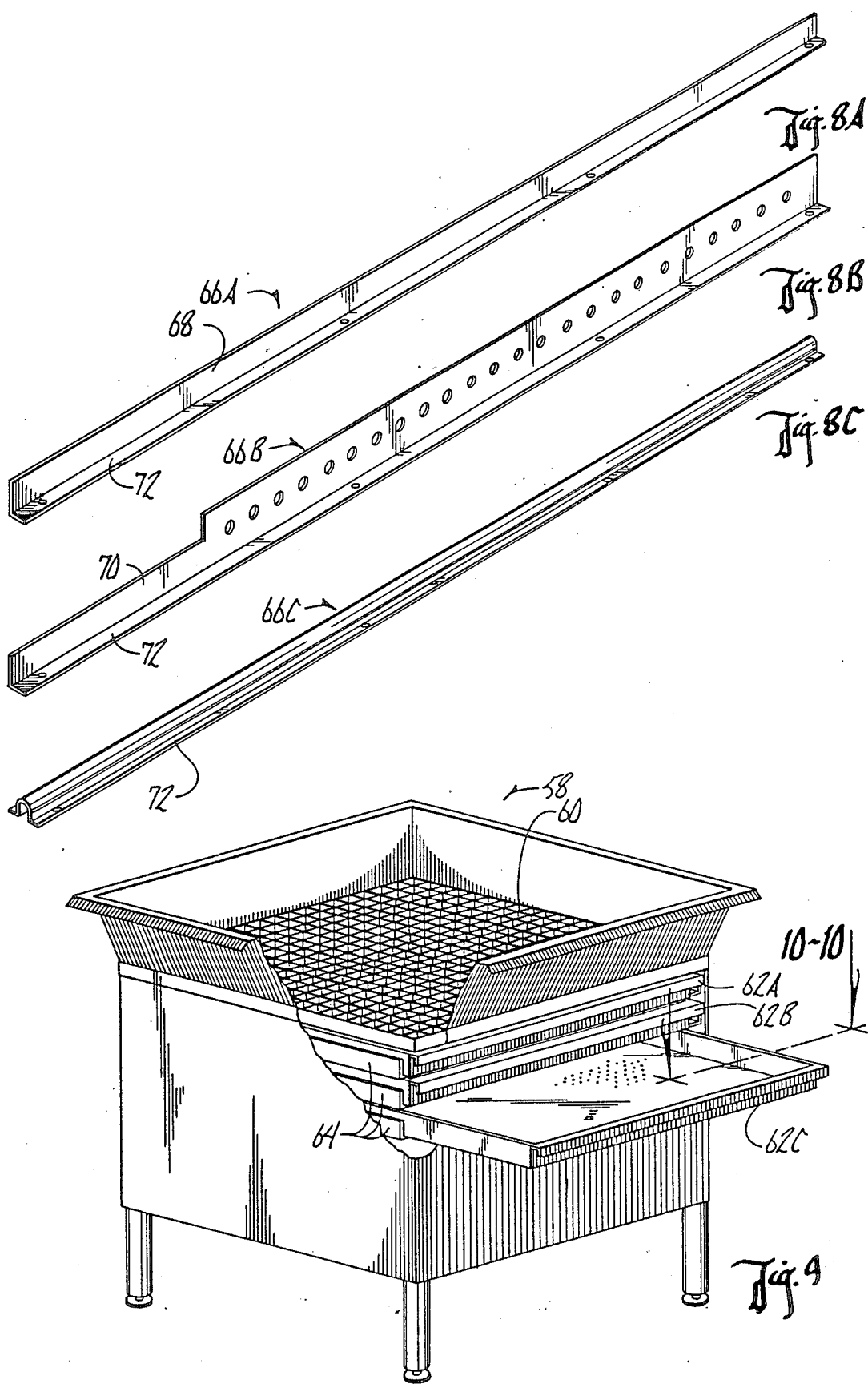

4,796,435

BY-PRODUCTS CHILLER AND METHOD FOR USING SAME

This application is a continuation-in-part of application Ser. No. 856,469, filed Apr. 28, 1986 now U.S. Pat. No. 4,700,546.

BACKGROUND OF THE INVENTION

Packing plant by-products, such as lungs, kidneys, hearts and other parts generally not consumed by humans, are often sold and used to make pet food. These by-products are initially at the body temperature of the butchered animal when removed therefrom, and are therefore highly susceptible to spoilage. Due to such potential for spoilage, the by-products have a very short life. The warm by-products must be quickly transported from the packing plant which slaughters the animal to the remote processing plant for conversion into pet food. Without such hurried pick-up and delivery, the by-products become spoiled and must be discarded.

U.S. Pat. Nos. 4,578,957 and 4,577,466 both disclose a by-products chiller for chilling fresh animal by-products and thereby reducing potential spoilage of the by-products prior to further processing. In both of these patents, the chiller basically comprises a rotatable cylindrical tank having an inlet end for introducing fresh animal by-products and an outlet end for removing chilled by-products. A liquid coolant is introduced into the tank and drains from the tank through a plurality of apertures in the side wall thereof. The liquid coolant is re-cooled and recirculated through the tank for cooling additional by-products.

One of the primary problems with the chillers disclosed in the '957 and '466 patents is that the plurality of apertures in the tank through which the liquid coolant drains become plugged by hair, fat, skin and the like which are extraneous associated materials commonly found by the by-products. Such plugging of the apertures prevents effective circulation of the liquid coolant, and thereby necessitates timely and costly cleaning of the apertures in the tank.

The chillers of the '957 and '466 patents also have elongated baffle bars permanently fixed to the interior side wall of the tank. These baffle bars facilitate the chilling of the by-products by agitating the by-products as the tank rotates. However, different types of by-products are better agitated by different sized and shaped baffle bars. For example, beef by-products are generally larger and heavier than pork by-products, and therefore larger baffle bars are required to agitate the beef byproducts.

It is also desirable to chill fresh animal hides in the chiller so that conventional chemicals and salts are not necessary for the preservation of the hide. However, a baffle bar with a broad or rounded edge is required to agitate the hide, which may be damaged by the relatively sharp edge L-shaped bars shown in the '957 and '466 patents.

Therefore, a primary objective of the present invention is the provision of an improved by-products chiller for lowering the temperature of fresh animal by-products and hides.

A further objective of the present invention is the provision of a by-products chiller, and method of using the same, which will run continuously without the need for frequent cleaning.

Another objective of the present invention is the provision of a by-products chiller and method for using the same which accommodates various types of animal by-products and hides.

SUMMARY OF THE INVENTION

The by-products and hide chiller of the present invention comprises a rotatable elongated tank having an inlet end for introducing fresh animal by-products into the tank and an outlet end for removing the by-products from the tank. The side wall of the tank if void of apertures so as to eliminate the cleaning problems associated with apertured tanks. A set of baffle bars are removably mounted within the tank for agitating the by-products, and can be interchanged with other sets of baffle bars having different cross-sectional shapes. The different sets of baffle bars allow different types of by-products and/or hides to be effectively and efficiently chilled in the tank.

A liquid coolant is introduced into the tank for cooling the by-products or hides and is drained from the outlet end of the tank into a strainer unit. The strainer unit has a plurality of removable straining trays which successively strain substantially all solids from the drained coolant. The coolant is then pumped back to the coolant source for recooling and subsequent reuse in cooling additional by-products in the tank.

An outlet plate is removably secured to the outlet end of the tank and has an opening therein through which the coolant normally drains and through which the by-products normally are removed from the tank. The outlet plate can be removed for easy access to the interior of the tank for cleaning purposes and to remove all the liquid and by-products from the tank.

BRIEF DESCRIPTION OF THE DRAWINGS

FIG. 1 is a top plan view of the by-products chiller of the present invention.

FIG. 2 is a side elevational view of the by-products chiller.

FIG. 3 is a sectional view taken along lines 3—3 of FIG. 2.

FIG. 4 is an end view of the by-products chiller taken along lines 4—4 of FIG. 2.

FIG. 5 is a sectional view taken along lines 5—5 of FIG. 3, and showing the stabilizer wheels for preventing the tank from moving longitudinally while rotating.

FIG. 6 is a sectional side elevational view showing the slasher unit of the chiller.

FIG. 7 is a partial perspective view showing the coolant inlet pipe of the chiller.

FIGS. 8A, 8B and 8C are perspective views of different baffle bars which can be interchangeably secured to the interior of the tank for agitating the by-products or animal hides.

FIG. 9 is a perspective view of the strainer unit of the present invention.

DETAILED DESCRIPTION OF THE DRAWINGS

Figure 10:
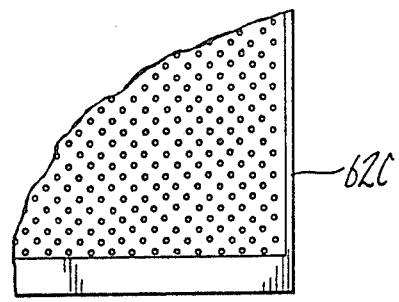
FIG. 10 is a partial plan view taken along lines 10—10 of FIG. 9 showing part of the lower straining tray of the strainer unit.
Figure 11:
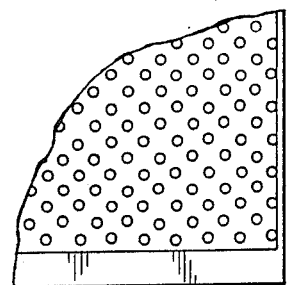
FIG. 11 is a view similar to FIG. 10 showing a part of a straining tray positioned above that shown in FIG. 10.

The animal by-products and hides chiller of the present invention is generally designated in the drawings by the reference numeral 10. Chiller 10 is located at the packing plant where the animals are slaughtered. The chiller basically comprises an elongated chilling tank 12 rotatably mounte above a frame 14. Liquid coolant from a coolant source 16 is circulated through tank 12 for cooling the by-products.

More particularly, tank 12 includes a body 18 having a first end 20 with an inlet opening 22 therein and a second end 24 including an outlet plate 26 with an outlet opening 28 therein. Outlet plate 26 is removably secured to the outlet end 24 of tank 12 by bolts 30 or the like. Preferably, plate 26 is comprised of two sections, such that only the lower section need be removed from tank 12 for draining all of the coolant from the tank, as explained later. Preferably, inlet opening 22 has a smaller diameter than outlet opening 28.

While tank 12 is shown to be cylindrical in the drawings, it is understood that body 18 of the tank can be formed from a plurality of panels interconnected to form a polygonal or substantially cylindrical tank.

A pair of trunnion wheels 32 are each rotatably mounted on an axle 34 supported by frame 14 at opposite ends of tank 12. Each pair of trunnion wheels 32 at each end of the tank 12 are positioned on each side of the longitudinal axis of the tank so that the tank is rotatably supported thereon.

Chiller 10 includes means for rotating tank 12 about its longitudinal axis as it is supported on trunnion wheels 32. The rotation means generally comprises a motor 36 mounted on frame 14 below tank 12, a first sprocket (not shown) attached to the drive shaft of motor 36, a second sprocket 38 fixed about the perimeter of tank body 18, and a chain 40 drivingly interconnecting the motor sprocket and tank sprocket 38. Thus, actuation of motor 36 imparts rotation to tank 12. A housing 42 extends substantially around sprocket 38 for safety purposes.

Also mounted on frame 14 is a support structure 44 to which is bolted a pair of stabilizer wheels 46, as best seen in FIG. 5. Stabilizer wheels 46 engage opposite sides of tank sprocket 38 so as to prevent tank 12 from moving longitudinally as the tank rotates upon trunnion wheels 32.

An inlet chute 48 extends through inlet opening 22 so as to deposit fresh animal by-products from a slasher unit 50. Slasher unit 60 is described in detail in applicant's co-pending application, Ser. No. 856,469, filed Apr. 28, 1986. Generally, slasher unit 50 slashes the by-products prior to their deposit in tank 12 so as to produce more surface area and thereby make the cooling process more effective and more efficient. Slasher unit 50 includes a motor 52, a blade shaft 54 extending from motor 52, and a plurality of circular slashing blades 56 mounted on shaft 54 for rotation therewith.

Chiller 10 also includes a strainer unit 58 positioned adjacent outlet end 24 of tank 12. Strainer unit 58 serves as a receptacle for the cooled by-products and the liquid coolant as both are expelled from the outlet opening 28 of tank 12. Strainer unit 58 includes a grate 60 and a plurality of straining trays 62A, 62B, 62C positioned one below the other. Preferably, the holes in grate 60 are approximately one inch square, while the holes in the straining trays become progressively smaller from the top tray to the bottom tray. While straining unit 58 is shown and have three straining trays 62A, 62B and 62C, it is understood that two or more trays could be provided. Also, it is understood that the holes in each successively lower tray be smaller, or at least no greater, than the holes in the next adjacent upper tray.

Trays 62A–62C are supported on opposite sides by L-shaped brackets 64 mounted on strainer unit 58. As seen in FIG. 9, trays 62A–62C are quickly and easily removed from strainer unit 58 for cleaning purposes. The plurality of trays also allows the chilling operation to proceed continuously, since there will always be at least one tray in the strainer unit for straining solids from the liquid coolant, as described below.

As seen in FIG. 3, a plurality of baffle bars 66 are secured to the interior of body 18 of tank 12. The baffle bars serve to agitate the by-products as the tank rotates. More particularly, bars 66 are removably secured to the interior of tank 12 by bolts or the like (not shown).

FIGs. 8A, 8B, and 8C illustrate three different baffle bars 66A, 66B, and 66C, respectively. Bars 66A and 66B are L-shaped, while bar 66C is substantially U-shaped. More particularly, bar 66A has a three inch primary leg 68 as compared to the six inch primary leg 70 of bar 66B. Due to the height of leg 70 of bar 66B, holes are provided therein so that the liquid coolant is not carried by the bar as the tank rotates. Also, the height of leg 70 of bar 66B is reduced adjacent the outlet end 24 of tank 12 so that by-products and liquid coolant are not accidentally spilled or splashed out of the outlet opening 28. Each of bars 66A, 66B and 66C have a depending flange 72 with holes therein for receiving the bolts which secure the bar to the interior of tank 12.

Each of bars 66A–66C is designed for use with a particular type of by-product or hide. Bar 66A is intended for use with pork by-products. Bar 66B is intended for use with beef by-products, which tend to be larger and heavier than pork by-products. Bar 66C is intended for use with hides and therefore has a curved U-shaped surface so as to prevent damage to the hides.

Figure 12:
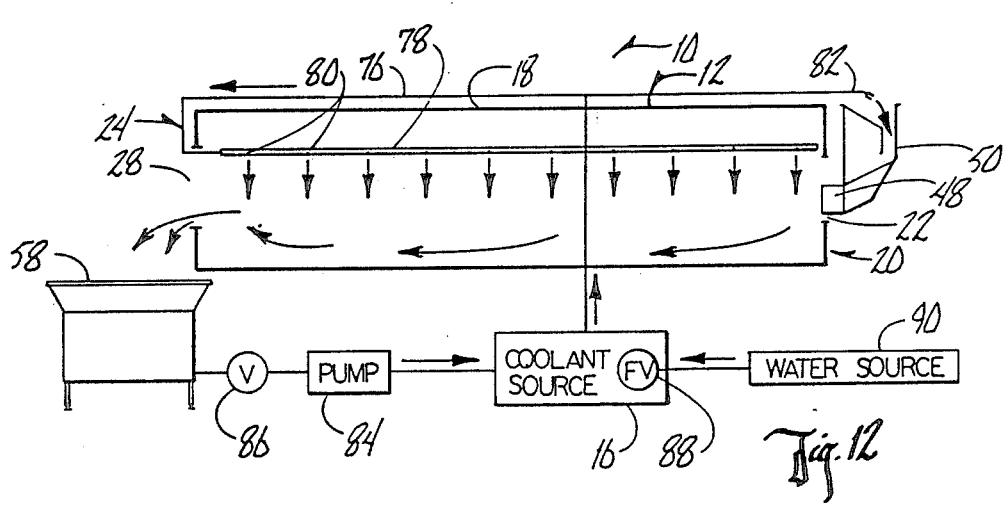
FIG. 12 is a schematic of the by-products chiller of the present invention.

Liquid coolant from the coolant source 16 is supplied to the interior of tank 12 by supply conduit 76. Conduit 76 is connected to a pipe 78 extending into tank 12 as best seen in FIG. 12. Pipe 78 has a plurality of holes 80 cut therein through which the liquid coolant is introduced into tank 12. While pipe 78 is shown be a square pipe with holes 80 being cut in the lower oriented corner of the square pipe, it is understood that the pipe may be round with holes drilled through the pipe wall. Holes 80 are large in comparison to those provided in sprayers, such as those disclosed in U.S. Pat. Nos. 4,578,957 and 4,577,466, and therefore do not become clogged as do the sprayers of the prior art. Also, while conduit 76 and pipe 78 are shown in FIG. 12 to extend into tank 12 through outlet opening 26 thereof, this plumbing could also extend into tank 12 through inlet opening 20 thereof.

A second supply conduit 82 provides liquid coolant from the coolant source to slasher unit 50, as best seen in FIG. 2. This supply of coolant to the slasher unit helps lubricate the slasher unit and thereby enhances the operation of the unit.

As by-products and liquid coolant are expelled from outlet opening 26 of tank 12 and received in strainer unit 58, the coolant drains through grate 60 and straining trays 62 and is recirculated by a pump 84 to the coolant source 16 for recooling thereby. A valve 86 controls the flow of coolant from slasher unit 58 to pump 84, while a float valve 88 controls the level of coolant in coolant source 16, as shown in FIG. 12. Also, a fresh water source 90 is connected to coolant source 16 so that the quantity of liquid coolant can be maintained at its desired level and so that the liquid coolant can be completely changed when necessary.

Figure 13:
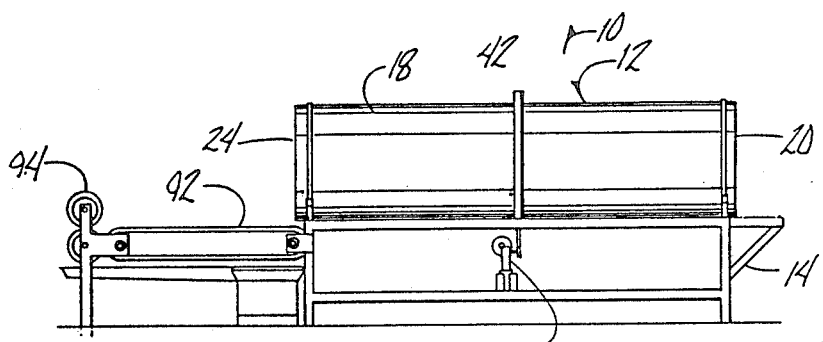
FIG. 13 is a simplified side elevational view of the chiller with a conveyor and wringer assembly positioned adjacent the outlet end of the tank.

As shown in FIG. 13, a conveyor 92 may be provided adjacent the outlet end of tank 12 so as to carry the cooled by-products or hides to a desired location. Conveyor 92 allows the liquid coolant expelled from outlet opening 26 of tank 12 to fall into strainer unit 58 for recirculation. Also, when hides are being chilled, a pair of wringer rollers 94 are provided so as to remove excess coolant from the hides.

In operation, the fresh by-products are introduced into slasher unit 50, wherein they are cut so as to expose more surface area for efficient and effective cooling. Slasher unit 50 is not used during the chilling of hides, since it is not desirable to cut the hides. The by-products or hides are deposited in the inlet end of the tank through inlet opening 22 as the tank is rotated by the cooperation of motor 36, sprocket 38 and chain 40. Liquid coolant from coolant source 16 is introduced into tank 12 via supply line 76 and pipe 78. Since there are not apertures in the body 18 of tank 12, the depth of coolant in the tank is maintained at a level extending up to the outlet opening 28 of the tank. Outlet plate 26 may be exchanged with a similar outlet plate such having a different sized outlet opening, such that the depth of the coolant in the tank can be adjusted.

Thus, the by-products and hides are bathed in the coolant. This emersion of the by-products or hides in the coolant hastens the cooling thereof. In comparison, in prior art chillers such as that disclosed in the 4,578,957 and 4,577,466 patents, the coolant continuously drains through the apertures in the tank side wall such that there is no substantial depth to the coolant. In these prior art chillers, the by-products are showered by the liquid coolant, such that a longer time is required to cool the by-products and hides, as compared to the time required by the present chiller.

As additional by-products and liquid coolant are introduced into tank 12, the previously introduced by-products, now cooled, are forced out of outlet opening 28 and received on grate 60 of strainer unit 58. A quantity of liquid coolant also spills out of outlet opening 28 with the cooled by-products This quantity of coolant drains through the straining trays 62A–62C of strainer unit 58 such that substantially all of the solids carried thereby are removed from the coolant. The quantity of coolant is then pumped by pump 84 to the coolant source 16 for recooling thereby and is then reused in tank 12 for cooling additional by-products. As trays 62A, 62B and 62C become full of solids or the opening therein becomes plugged, the trays can be removed one at a time for cleaning, while the chiller continues to operate.

At the end of the day or other time the chiller 10 is shut down, outlet plate 26, or the lower half thereof, can be removed so that all of the contents of the tank can be removed therefrom. Also, removal of outlet plate 26 permits easy access to the interior of tank 12 for cleaning purposes and for changing baffle bars 66. Furthermore, since there are no apertures in the sidewall of tank 12, cleaning time is reduced approximately 85%, as compared to the apertured tanks disclosed in the prior art.

Preferably, the liquid coolant comes into tank 12 at approximately 33° F. Since the fresh by-products are considerably warmer, heat is absorbed from the by-products by the liquid coolant such that the by-products are cooled. Accordingly, the life of the by-products is increased and the potential for spoilage is reduced. Also, since the liquid coolant is recirculated in the system, the cost of operating the chiller is minimized.

From the foregoing, it can be seen that the present invention accomplishes at least all of the stated objectives.

What is claimed is:

1. A by-products and hide chiller, comprising:
   an elongated tank having an inlet end for introducing fresh animal by-products into said tank and an outlet end for removing said by-products from said tank;
   said tank having a sidewall extending between said inlet and outlet ends, said sidewall being void of apertures;
   support means for rotatably supporting said tank;
   means for introducing a liquid coolant from a coolant source into said tank so as to partially fill said tank with a body of liquid coolant for bathing and thereby cooling said by-product or hides therein;
   said liquid coolant draining from said tank from said outlet end of said tank;
   circulation means for recirculating said liquid coolant drained from said tank to said coolant source for re-cooling thereby and for subsequent re-introduction into said tank for cooling additional by-products or hides therein; and
   means operatively secured to said tank for rotating said tank about its longitudinal axial such that said by-products or hides are tumbled within said tank and bathed in said coolant and chilled thereby.

2. The chiller of claim 1 further comprising an outlet plate secured to said outlet end of said tank and having an opening therein through which said coolant drains and through which said by-products are removed.

3. The chiller of claim 2 further comprising means for removably securing said outlet plate to said outlet end of said tank, whereby said outlet plate can be removed to faciliate cleaning of said tank.

4. The chiller of claim 2 wherein said outlet plate includes a plurality of sections, with at least one section being removably secured to said outlet end of said tank to facilitate cleaning of said tank.

5. The chiller of claim 1 further comprising baffle means removably mounted in said tank for agitating said by-products.

6. The chiller of claim 5 wherein said baffle means includes a first set of elongated bars extending along the interior of said tank, and a second set of elongated bars are selectively interchangeable with said first set of bars, said first and second sets of bars having different cross-sectional shapes for use with different types of products or hides being chilled.

7. The chiller of claim 1 wherein said means for rotating said tank includes a tank sprocket circumferentially mounted on said tank intermediate the opposite ends thereof, a power means having a rotatable drive sprocket operatively connected thereto, and a chain means drivingly interconnecting said drive sprocket and said tank sprocket.

8. The chiller of claim 2 further comprising stabilizer means engaging said tank for preventing said tank from moving longitudinally while rotating, said stabilizer means including a pair of rotatable guidance wheels engaging opposite sides of said tank sprocket.

9. The chiller of claim 1 wherein said means for introducing liquid coolant into said tank includes a pipe extending into said tank and substantially along the length thereof, said pipe having a plurality of openings therein through which said coolant is introduced into said tank.

10. The chiller of claim 1 further comprising a strainer unit adjacent the outlet end of said tank for straining substantially all solids from said coolant prior to recirculation to said coolant source.

11. The chiller of claim 10 wherein the strainer unit includes a plurality of removable straining trays, each one being positioned below the other, each tray having a plurality of openings, the openings of each successively lower tray being no larger than the openings of the next adjacent upper tray.

12. An improved by-products and hide chiller having an elongated rotatable tank with an inlet end for introducing warm animal by-products or hides into said tank and an outlet end for removing said by-products or hides from said tank, and tank, and means for circulating cooling liquid through said tank for cooling said by-products or hides therein, said improvement comprising:
a plurality of interchangable sets of baffle bars, one of said sets being selectively mounted within said tank for agitating said by-products or hides, said bars of each of said sets having different cross-sectional shapes for selective use with different types of by-products or hides being chilled.

13. The chiller of claim 12 wherein the bars of one of said sets have L-shaped cross-sections and the bars of another of said sets have substantially U-shaped cross-sections.

14. An improved by-products and hide chiller having an elongated rotatable tank with an inlet end for introducing warm animal by-products or hides into said tank and an outlet end for removing said by-products or hides from said tank, and means for circulating cooling liquid through said tank for cooling said by-products therein, said improvement comprising:
an associated strainer unit adjacent said outlet end of said tank for straining substantially all solids from said cooling liquid prior to circulating said liquid,
said strainer unit having a plurality of removable straining trays, one being positioned below the other, each tray having a plurality of openings, the openings of each successively lower tray being no larger than the openings of the next adjacent upper tray.

15. A method of preserving fresh animal by-products and hides which are to be further processed, comprising:
introducing, at the slaughter vicinity, warm by-products of hides into the inlet end of an elongated chilling tank having sidewalls void of apertures;
introducing liquid coolant from a coolant source into said tank so as to partially fill said tank with a body of liquid coolant;
rotating said tank such that said by-products or hides are tumbled therein and bathed in said coolant whereby heat is transferred from said by-products or hides to said coolant thereby chilling said by-products or hides to minimize spoilage thereof;
removing said chilled by-products or hides from the outlet end of said tank;
draining said liquid coolant from the outlet end of said tank; and
recirculating said drained liquid coolant to said coolant source for re-cooling thereby, whereafter said liquid coolant is re-introduced into said tank for chilling additional by-products or hides.

16. The method of claim 15 further comprising straining the coolant drained from said tank to remove substantially all solids from the coolant prior to recirculation to said coolant source.

17. The method of claim 16 wherein said coolant is strained through a plurality of straining trays removably mounted in a strainer unit, each tray being independently removable from said strainer unit for cleaning while the other trays continue to strain said coolant.

18. The method of claim 15 wherein the by-products are moved from the inlet end to the outlet end of the tank by the introduction of additional by-products into the tank and by the introduction of additional coolant into the tank.

19. The method of claim 15 further comprising agitating said by-products to facilitate chilling thereof by said coolant.

20. The method of claim 15 wherein said tank includes a sidewall void of apertures such that said method can operate substantially continuously without the need to clean said tank.

21. The chiller of claim 1 wherein said tank has a horizontally disposed longitudinal axis.

* * * * *